United States Patent [19]

Kurakake

[11] Patent Number: 4,464,614
[45] Date of Patent: Aug. 7, 1984

[54] NUMERICAL CONTROL UNIT

[75] Inventor: Mitsuo Kurakake, Hino, Japan

[73] Assignee: Fanuc Ltd., Tokyo, Japan

[21] Appl. No.: 361,921

[22] PCT Filed: Jul. 16, 1981

[86] PCT No.: PCT/JP81/00165
§ 371 Date: Mar. 15, 1982
§ 102(e) Date: Mar. 15, 1982

[87] PCT Pub. No.: WO82/00371
PCT Pub. Date: Feb. 4, 1982

[30] Foreign Application Priority Data

Jul. 17, 1980 [JP] Japan ................................. 55-97774

[51] Int. Cl.³ .............................................. G05B 19/24
[52] U.S. Cl. ..................................... 318/571; 318/39; 318/663
[58] Field of Search ............... 318/663, 571, 39, 675

[56] References Cited

U.S. PATENT DOCUMENTS

| | | | |
|---|---|---|---|
| 3,418,547 | 12/1968 | Dudler | 318/663 X |
| 3,962,620 | 6/1976 | Dion | 318/604 X |
| 4,047,818 | 9/1977 | Steinbatz | 318/663 X |
| 4,132,941 | 1/1979 | Sousek | 318/663 |
| 4,263,539 | 4/1981 | Barton | 318/663 X |
| 4,358,721 | 11/1982 | Farr | 318/604 |

*Primary Examiner*—B. Dobeck
*Attorney, Agent, or Firm*—Staas & Halsey

[57] ABSTRACT

In a numerical control unit capable of driving a motor at a feed speed designated by a feed speed-designation dial, there are provided a potentiometer for generating a DC voltage proportional to the amount that a feed speed-designation knob is turned and an AD converter for converting the DC voltage output from the potentiometer into a digital quantity, the AD converter output being read out by a main processor section. The circuit construction can be markedly simplified as compared with the conventional circuit construction employing a voltage-controlled variable oscillator.

4 Claims, 2 Drawing Figures

NUMERICAL CONTROL UNIT

BACKGROUND AND SUMMARY OF THE INVENTION

The present invention relates to a numerical control unit which adopts what is called an F1-digit feed command system, which is capable of driving a motor at a feed speed designated by a feed speed-designation dial on an NC control panel.

The F1-digit feed command system permits the operator to carry out actual machining while controlling the feed speed for each process by turning a feed speed-designation dial on a control panel installed on the side of an NC cabinet or a machine, and this is one of the feed speed command systems suitable for use when machining dies or the like if the optimum cutting speed is unknown before actual machining is started. In a conventional numerical control unit employing this kind of system, a voltage-controlled variable frequency oscillator is driven by a DC voltage proportional to the amount that a knob of the feed speed-designation dial is turned to generate a signal of a frequency proportional to the amount of the rotational movement of the knob, and the frequency is counted by a main processor section and then the motor is driven at a feed speed proportional to the results of the counting. The prior art unit thus includes an analog oscillation circuit, and hence it has the defects that it has to be adjusted at many places and is complicated in circuit construction because of the necessity for reducing variations in the oscillation frequency.

The present invention offers a solution to such defects of the prior art and has for its object to provide a numerical control unit which achieves the F1-digit feed command system with a simple circuit structure.

DESCRIPTION OF THE PREFERRED EMBODIMENTS

For describing the present invention in more detail, an embodiment will hereinafter be described in detail.

Figure 1:
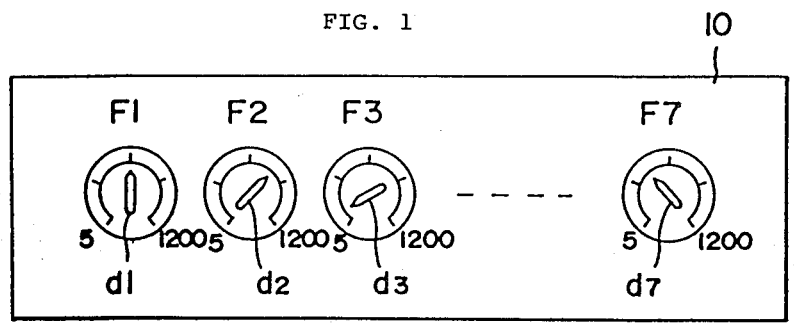
FIGS. 1 and 2 are explanatory of the arrangement of an embodiment of the present invention, FIG. 1 being a plan view of a control panel on which feed speed-designation dials are mounted and FIG. 2 being a block diagram showing the principal part of an electric circuit section of the F1-digit feed command system.
Figure 2:
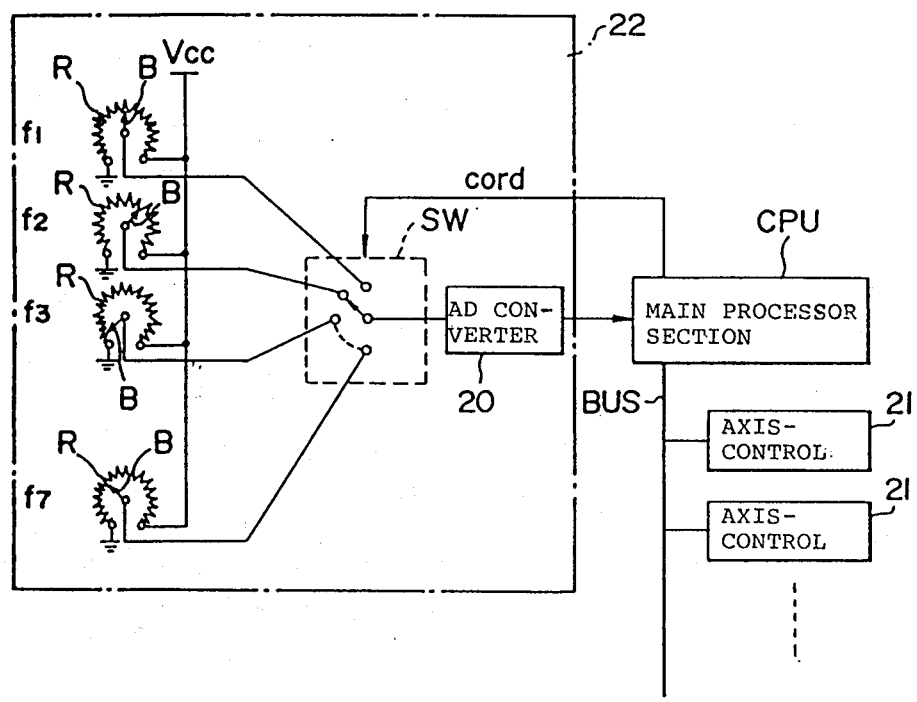

FIGS. 1 and 2 are explanatory of an embodiment of the present invention, FIG. 1 being a plan view of a control panel on which feed speed-designation dials are mounted and FIG. 2 being a block diagram showing the principal part of an electric circuit section of the F1-digit feed command system.

In FIG. 1, reference numeral 10 indicates a control panel; and F1 to F7 designate feed speed-designation dials, which are respectively provided with graduations indicating feed speeds, for instance, from 5 mm/minute to 1200 mm/minute, and which are adapted for use by setting knobs d1 to d7 to desired graduations.

In FIG. 2, reference characters f1 to f7 identify potentiometers, each of which yields a DC voltage proportional to the amount the knob of one of the feed speed-designation dials F1 to F7 is turned. The potentiometers are each made up of a resistor R supplied, for example, with such a predetermined voltage Vcc as shown and a brush B sliding on the resistor R in gauged relation to the corresponding one of the knobs d1 to d7. Reference character SW denotes a selection switch, which selects the potentiometer output corresponding to the feed speed-designation dial designated, via an interpreted signal cord, in a machining program. Incidentally, such an arrangement has heretofore been well known.

According to the present invention, in the arrangement described above, an AD converter 20 is provided and the output from the selection switch SW is applied to the AD converter 20, by which the DC voltage output from each of the potentiometers f1 to f7 is converted into a digital quantity. The digital quantity is read out by a main processor section CPU which performs data processing for numerical control, and a motor is driven at a feed speed proportional to the digital quantity. In FIG. 2, reference character BUS indicates a main bus; 21 designates axis control circuits; and 22 identifies an F1-digit unit.

As will be seen from the foregoing description, according to the present invention, the AD converter is provided for converting the DC voltage output from each potentiometer and the AD converter output is read out by the main processor section; therefore, the circuit construction is markedly simplified as compared with the conventional one employing a voltage-controlled variable oscillator. Especially in recent years, there are readily available at low cost one-chip high-performance AD converters, for instance, having eight analog input channels, 10 output bits, and a conversion speed of several μs; if such a converter is employed in the present invention, the AD converting section including the selection switch SW in FIG. 2 could be formed on one chip, permitting further simplification and economization of the circuit structure.

What is claimed is:

1. A numerical control unit for driving a motor at a feed speed designated by a feed speed dial on a control panel having a plurality of feed speed dials, each having a manually operable knob, the numerical control unit having a main processor section which performs data processing for numerical control and which emits a selection signal to select which of the feed speed dials will designate the motor's feed speed, comprising:
    potentiometer means corresponding to each knob for producing a DC voltage proportional to the amount that the corresponding knob is turned;
    analog/digital converter means for receiving an analog input signal and supplying a digital output signal to said main processor section; and
    switch means connected between said potentiometer means and said analog/digital converter means for selecting a DC voltage to apply to said analog/digital converter means as said input signal in response to said selection signal.

2. The numerical control unit of claim 1, wherein said potentiometer means comprises power supply means for providing DC power, and a plurality of potentiometers mounted on said control panel, each potentiometer having a first terminal that is grounded, a second terminal connected to said power supply means, and a wiper terminal connected to said switch means, said switch means connecting one of the wiper terminals to the analog/digital converter means in response to said selection signal.

3. The numerical control unit of claim 1, wherein the analog/digital converter means comprises an analog/digital converter integrated circuit which supplies a digital output signal corresponding to an analog input signal without employing a voltage controlled oscillator.

4. The numerical control unit of claim 3, wherein the analog/digital converter integrated circuit supplies a digital output greater than two bits wide.

* * * * *